US012743042B2

(12) United States Patent
Sugino

(10) Patent No.: US 12,743,042 B2
(45) Date of Patent: Sep. 22, 2026

(54) FIXING DEVICE AND IMAGE FORMING APPARATUS

(71) Applicant: FUJIFILM Business Innovation Corp., Tokyo (JP)

(72) Inventor: Mizuki Sugino, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/306,220

(22) Filed: Apr. 24, 2023

(65) Prior Publication Data

US 2024/0210860 A1 Jun. 27, 2024

(30) Foreign Application Priority Data

Dec. 26, 2022 (JP) ................................. 2022-207824

(51) Int. Cl.
*G03G 15/20* (2006.01)

(52) U.S. Cl.
CPC ..... *G03G 15/2053* (2013.01); *G03G 15/2017* (2013.01); *G03G 15/2064* (2013.01); *G03G 2215/2038* (2013.01)

(58) Field of Classification Search
CPC ........... G03G 15/2017; G03G 15/2053; G03G 15/2064; G03G 2215/2038
See application file for complete search history.

(56) References Cited

U.S. PATENT DOCUMENTS

| | | | | |
|---|---|---|---|---|
| 2011/0305473 A1* | 12/2011 | Tamaki | G03G 15/2053 399/329 |
| 2017/0248885 A1* | 8/2017 | Saito | G03G 15/2053 |
| 2019/0310573 A1* | 10/2019 | Onaka | G03G 15/2053 |
| 2019/0324391 A1* | 10/2019 | Matsuo | G03G 15/2053 |
| 2022/0291613 A1* | 9/2022 | Yamaguchi | G03G 15/2053 |
| 2022/0390884 A1* | 12/2022 | Yamamoto | G03G 15/2064 |
| 2024/0103413 A1* | 3/2024 | Ishihara | G03G 15/2053 |
| 2024/0142902 A1* | 5/2024 | Koyanagi | G03G 15/2053 |
| 2024/0160138 A1* | 5/2024 | Shibuya | G03G 15/2053 |

FOREIGN PATENT DOCUMENTS

| | | |
|---|---|---|
| JP | 2010128299 | 6/2010 |
| JP | 2014006317 | 1/2014 |
| JP | 2021156927 | 10/2021 |

* cited by examiner

*Primary Examiner* — Sophia S Chen
(74) *Attorney, Agent, or Firm* — JCIPRNET

(57) ABSTRACT

A fixing device includes an endless belt of which a surface layer is elastically deformable and a pressurizing section that is in pressure contact with the belt and that forms a nip portion, in which a maximum deformation position at which a degree of deformation of a surface of the belt is maximal is set to a position different from a maximum pressure position at which a pressurizing force of the belt is maximal.

17 Claims, 9 Drawing Sheets

FIG. 13

| HEIGHT | DIFFERENCE BETWEEN MAXIMUM PRESSURE POSITION AND MAXIMUM BELT DEFORMATION POSITION | IMAGE QUALITY | PAPER DEFORMATION |
|---|---|---|---|
| 1.2 | YES | × | ○ |
| 1.3 | YES | × | ○ |
| 1.4 | YES | ○ | ○ |
| 1.5 | YES | ○ | ○ |
| 1.6 | YES | ○ | ○ |
| 1.7 | NO | ○ | × |
| 1.8 | NO | ○ | × |

FIXING DEVICE AND IMAGE FORMING APPARATUS

CROSS-REFERENCE TO RELATED APPLICATIONS

This application is based on and claims priority under 35 USC 119 from Japanese Patent Application No. 2022-207824 filed Dec. 26, 2022.

BACKGROUND

(i) Technical Field

The present invention relates to a fixing device and an image forming apparatus.

(ii) Related Art

In the related art, as techniques related to fixing devices, for example, fixing devices disclosed in JP2010-128299A, JP2014-006317A, JP2021-156927A, or the like have already been proposed.

In the case of JP2010-128299A, a sliding portion of a support member has a shape in which a heating member is bent to protrude in a direction toward a pressurizing member and a ratio between the maximum value $\eta_{max}$ of the deformation rate of an elastic layer surface of a bent portion and the minimum value $\eta_{min}$ of the deformation rate of the elastic layer surface at a nip portion satisfies $1.0<\eta_{max}/\eta_{min}\leq 1.5$.

In JP2014-006317A, a guide member includes a contact surface composed of a curved surface that abuts against an inner surface of a fixing belt and that protrudes toward a pressure roller side and the curvature radius of the contact surface changes to decrease from an upstream side toward a downstream side in a rotational direction of the fixing belt.

In JP2021-156927A, a fixing member includes a curved surface portion that is provided on an upstream side in a rotational direction of an endless belt and a flat surface portion that is provided on a downstream side in the rotational direction and that is connected to the curved surface portion in a nip portion forming region in which a nip portion is formed. The curved surface portion is concavely curved in an arc-like shape with respect to a roller and the flat surface portion is provided to be positioned on a tangent line of the curved surface portion that is tangent to a connection position at which the flat surface portion is connected to the curved surface portion or to be inclined to the roller side with respect to the tangent line, so that the position of the peak of distribution of pressure applied to the nip portion forming region is present at the flat surface portion.

SUMMARY

Aspects of non-limiting embodiments of the present disclosure relate to a fixing device and an image forming apparatus with which it is possible to restrain a fixation target medium from being curved while securing fixability in comparison with a case where a maximum deformation position at which the degree of deformation of a surface of an endless belt is maximal and a maximum pressure position at which a pressurizing force of the belt is maximal are the same positions as each other in a nip portion formed by the belt and a pressurizing section.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a fixing device including an endless belt of which a surface layer is elastically deformable and a pressurizing section that is in pressure contact with the belt and that forms a nip portion, in which a maximum deformation position at which a degree of deformation of a surface of the belt is maximal is set to a position different from a maximum pressure position at which a pressurizing force of the belt is maximal.

BRIEF DESCRIPTION OF THE DRAWINGS

Exemplary embodiment(s) of the present invention will be described in detail based on the following figures, wherein:

FIG. 13 is a table showing the results of a simulation test in the fixing device according to Exemplary Embodiment 1 of the present invention.

DETAILED DESCRIPTION

Hereinafter, exemplary embodiments of the present invention will be described with reference to the drawings.

Exemplary Embodiment 1

Figure 1:
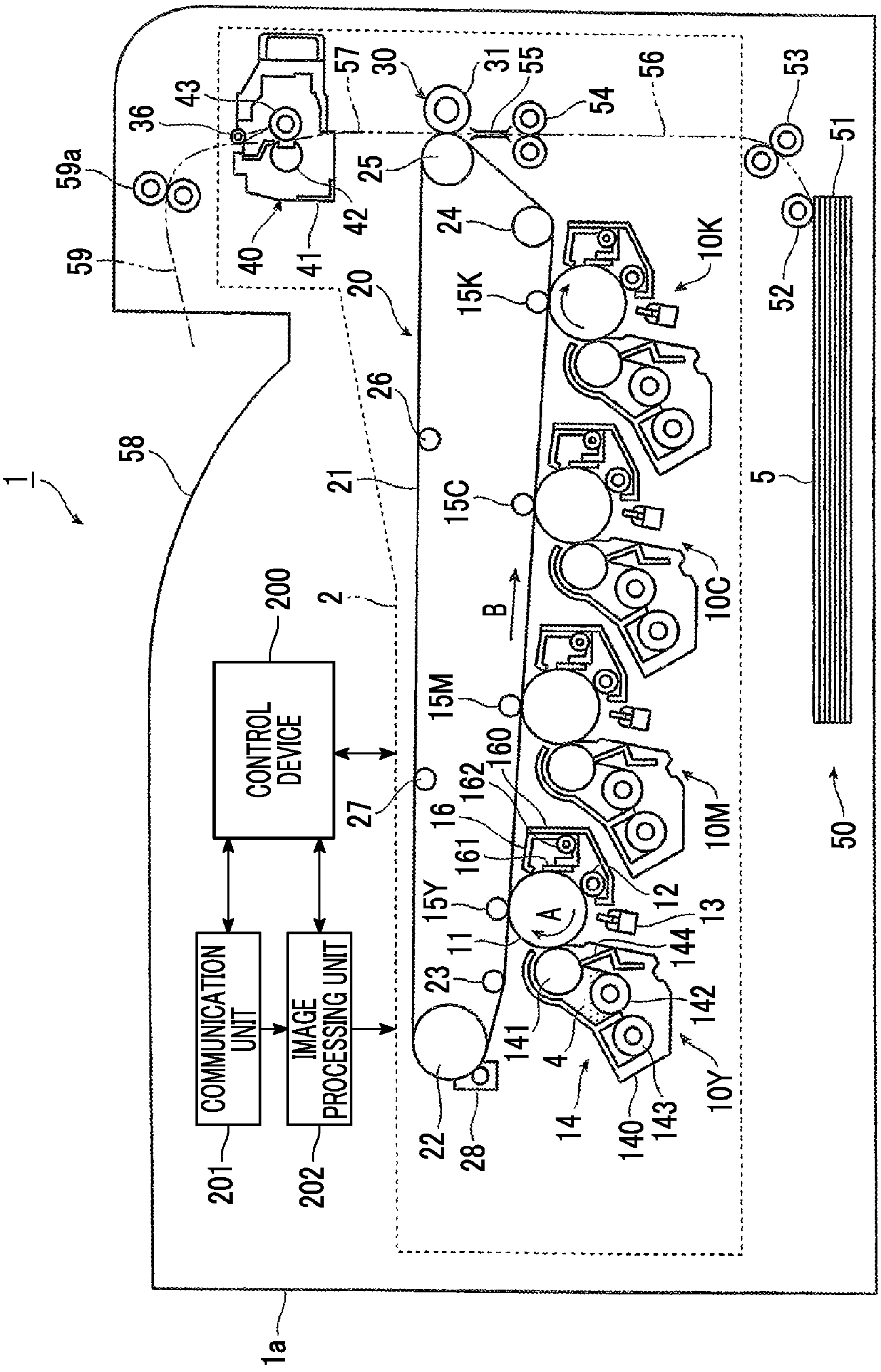
FIG. 1 is an overall configuration diagram showing an image forming apparatus to which a fixing device according to Exemplary Embodiment 1 of the present invention is applied.

FIG. 1 shows an image forming apparatus to which a fixing device according to Exemplary Embodiment 1 is applied.

Overall Configuration of Image Forming Apparatus

An image forming apparatus 1 according to Exemplary Embodiment 1 is configured as, for example, a color printer. The image forming apparatus 1 includes a plurality of image creating devices 10 that form toner images developed with a toner constituting a developer 4, an intermediate transfer device 20 that holds a toner image formed by each image creating device 10 and finally transports the held toner image to a secondary transfer position where the transported toner image is secondarily transferred to recording paper 5 serving as an example of a recording medium, a paper feed device 50 that accommodates and transports required recording paper 5 to be supplied to the secondary transfer position of the intermediate transfer device 20, a fixing device 40 that fixes the toner image on the recording paper 5 secondarily transferred by the intermediate transfer device 20 and that serves as an example of a fixing section, and the like. The plurality of image creating devices 10 and the intermediate transfer device 20 constitute an image forming section 2 that forms an image on the recording paper 5. In addition, 1*a* in the figure indicates an apparatus body of the image forming apparatus 1, and the apparatus body 1*a* is formed of a supporting structural member, an exterior cover, and the like. Additionally, a two-dot chain line in the figure indicates a major transport route along which the recording paper 5 is transported in the apparatus body 1*a*. The image forming section 2 is not limited to an image forming section that forms a full-color image, and it is a matter of course that the image forming section 2 may be an image forming section that forms a monochrome image.

The image creating devices 10 include four image creating devices 10Y, 10M, 10C, and 10K that exclusively form toner images in four colors of yellow (Y), magenta (M), cyan (C), and black (K), respectively. The four image creating devices 10 (Y, M, C, K) are disposed to be arranged in a row in an inclined state in an internal space of the apparatus body 1*a*.

The four image creating devices 10 include yellow (Y), magenta (M), and cyan (C) color image creating devices 10 (Y, M, C) and a black (K) image creating device 10K. The black image creating device 10K is disposed on the most downstream side along a movement direction B of an intermediate transfer belt 21 of the intermediate transfer device 20. The image forming apparatus 1 includes, as image forming modes, a full-color mode in which the color image creating devices 10 (Y, M, C) and the black (K) image creating device 10K are operated to form a full-color image, and a black-and-white mode in which only the black (K) image creating device 10K is operated to form a black-and-white (monochrome) image.

As shown in FIG. 1, each of the image creating devices 10 (Y, M, C, K) includes a rotating photoconductive drum 11 serving as an example of an image holder, and each device serving as an example of the following toner image forming section is disposed around the photoconductive drum 11 as major devices. The major devices are a charging device 12 that charges a peripheral surface (image holding surface) of the photoconductive drum 11, on which an image can be formed, to a required potential, an exposure device 13 that irradiates the charged peripheral surface of the photoconductive drum 11 with light based on information (signal) of an image to form an electrostatic latent image (for each color) having a potential difference, a developing device 14 (Y, M, C, K) that develops the electrostatic latent image with a toner of the developer 4 for a corresponding color (Y, M, C, K) to form a toner image, a primary transfer device 15 (Y, M, C, K) that transfers each toner image to the intermediate transfer device 20 and that serves as an example of a primary transfer section, and a drum cleaning device 16 (Y, M, C, K) that remove and clean a deposit such as the toner remaining on and adhering to the image holding surface of the photoconductive drum 11 after primary transfer.

The photoconductive drum 11 has an image holding surface having a photoconductive layer (photosensitive layer) made of a photosensitive material formed on a peripheral surface of a cylindrical or columnar base material to be subjected to ground treatment. The photoconductive drum 11 is supported such that power is transmitted thereto from a drive device (not shown) and the photoconductive drum 11 rotates in a direction indicated by arrow A.

The charging device 12 includes a contact type charging roll that is disposed in contact with the photoconductive drum 11. A charging voltage is supplied to the charging device 12. As the charging voltage, in a case where the developing device 14 performs reverse development, a voltage or current having the same polarity as the charging polarity of the toner supplied from the developing device 14 is supplied. In addition, as the charging device 12, a non-contact type charging device such as a scorotron disposed on the surface of the photoconductive drum 11 in a non-contact state may be used.

The exposure device 13 consists of an LED printhead that irradiates the photoconductive drum 11 with the light according to the image information by light emitting diodes (LEDs) serving as a plurality of light emitting elements arranged in an axial direction of the photoconductive drum 11 to form an electrostatic latent image. Note that, a device that performs deflection and scanning along the axial direction of the photoconductive drum 11 with laser light configured according to the image information may be used as the exposure device 13.

All of the developing devices 14 (Y, M, C, K) are configured such that a developing roll 141 that holds the developer 4 to transport the developer 4 to a developing region that faces the photoconductive drum 11, agitating and transporting members 142 and 143 such as two screw augers that transports the developer 4 to pass through the developing roll 141 while agitating the developer 4, a layer thickness regulating member 144 that regulates the amount (layer thickness) of the developer held on the developing roll 141, and the like are disposed inside a housing 140 in which an opening portion and an accommodation chamber of the developer 4 are formed. A developing voltage is supplied to the developing device 14 from a power supply device (not shown) between the developing roll 141 and the photoconductive drum 11. Additionally, the developing roll 141 and the agitating and transporting members 142 and 143 rotate in a required direction with power transmitted thereto from a drive device (not shown). Furthermore, as the four-color developers 4 (Y, M, C, K), two-component developers containing a non-magnetic toner and a magnetic carrier are used.

The primary transfer device 15 (Y, M, C, K) is a contact type transfer device including a primary transfer roll that rotates around the photoconductive drum 11 in contact therewith via the intermediate transfer belt 21 and is supplied with a primary transfer voltage. As the primary transfer voltage, a direct-current voltage indicating a polarity opposite to the charging polarity of the toner is supplied from the power supply device (not shown).

The drum cleaning device 16 includes a container-shaped main body 160 that partially opens, a cleaning plate 161 that is disposed to be in contact with the peripheral surface of the photoconductive drum 11 after the primary transfer at a required pressure and removes and cleans deposits such as residual toner, a delivery member 162 such as a screw auger that recovers the deposits such as toner removed by the cleaning plate 161 and transports the deposits for delivery to a recovery system (not shown), and the like. As the cleaning plate 161, a plate-shaped member (for example, a blade) made of a material such as rubber is used.

As shown in FIG. 1, the intermediate transfer device 20 is disposed to be present at a position above each image creating device 10 (Y, M, C, K). The intermediate transfer device 20 includes, as major components, the intermediate transfer belt 21 that rotates in a direction indicated by arrow B while passing through a primary transfer position between the photoconductive drum 11 and the primary transfer device 15 (primary transfer roll), a plurality of belt support rolls 22 to 27 that hold the intermediate transfer belt 21 in a desired state from an inner surface thereof and rotatably support the intermediate transfer belt 21, a secondary transfer device 30 serving as an example of a secondary transfer section that is disposed on an outer peripheral surface (image holding surface) side of the intermediate transfer belt 21 supported by the belt support roll 25 and secondarily transfers an toner image on the intermediate transfer belt 21 to the recording paper 5, and a belt cleaning device 28 that removes and cleans deposits such as toner and paper dust remaining on and adhering to the outer peripheral surface of the intermediate transfer belt 21 after passing through the secondary transfer device 30.

As the intermediate transfer belt 21, for example, an endless belt made of a material in which a resistance modifier such as carbon black is dispersed in a synthetic resin such as a polyimide resin or a polyamide resin is used. Additionally, the belt support roll 22 is configured as a drive roll that is rotationally driven by the drive device (not shown) that also serves as a counter roll of the belt cleaning device 28, the belt support roll 23 is configured as a face-out roll that forms an image forming surface of the intermediate transfer belt 21, the belt support roll 24 is configured as a tension applying roll that applies tension to the intermediate transfer belt 21, the belt support roll 25 is configured as a counter roll that faces the secondary transfer device 30, and the belt support rolls 26 and 27 are configured as driven rolls of the intermediate transfer belt 21.

As shown in FIG. 1, the secondary transfer device 30 is a contact type transfer device including a secondary transfer roll 31, which rotates in contact with a peripheral surface of the intermediate transfer belt 21 and is supplied with a secondary transfer voltage, at the secondary transfer position that is an outer peripheral surface portion of the intermediate transfer belt 21 supported by the belt support roll 25 in the intermediate transfer device 20. Additionally, a direct-current voltage showing the opposite polarity or the same polarity as the charging polarity of the toner is supplied to the secondary transfer roll 31 or the belt support roll 25 of the intermediate transfer device 20 from the power supply device (not shown) as the secondary transfer voltage.

The fixing device 40 is configured such that a heating belt 42 that is rotated in a direction indicated by an arrow and heated by a heating section such that the surface temperature is maintained at a predetermined temperature, a pressure roll 43 that is in contact with the heating belt 42 at a predetermined pressure and rotates substantially in an axial direction of the heating belt 42, and the like are disposed inside a housing 41 in which an introduction port and an ejection port of the recording paper 5 are formed. In the fixing device 40, a contact portion where the heating belt 42 and the pressure roll 43 are in contact with each other is a fixing treatment portion that performs a required fixing treatment (heating and pressurizing). In addition, the fixing device 40 will be described in detail below.

The paper feed device 50 is disposed to be present at a position below the image creating device 10 (Y, M, C, K). The paper feed device 50 includes, as major components, a single (or a plurality of) paper accommodation body 51 that accommodates the recording paper 5 of a desired size, type, or the like in a loaded state, and a delivery device 52 that delivers recording paper 5 sheet by sheet from the paper accommodation body 51. The paper accommodation body 51 is attached such that the paper accommodation body 51 can be pulled out to a front side (a side surface facing a user during operation) of the apparatus body 1*a*, for example.

Examples of the recording paper 5 include thin paper such as plain paper and tracing paper, OHP sheets, or the like, which are used in electrophotographic copying machines and printers. In order to further improve the smoothness of an image surface after fixing, for example, it is preferable that the surface of the recording paper 5 is as smooth as possible. For example, coated paper in which the surface of plain paper is coated with resin or the like, so-called thick paper such as art paper for printing, or the like having a relatively large basis weight can also be suitably used.

A paper feed transport route 56 including a single or a plurality of paper transport roll pairs 53 and 54, which transport the recording paper 5 delivered from the paper feed device 50 to the secondary transfer position, and a transport guide 55 is provided between the paper feed device 50 and the secondary transfer device 30. The paper transport roll pair 54 disposed at a position immediately before the secondary transfer position in the paper feed transport route 56 is configured as, for example, a roll (registration roll) that adjusts the transport timing of the recording paper 5. Additionally, a paper transport route 57 for transporting the recording paper 5 after the secondary transfer, which is delivered from the secondary transfer device 30, to the fixing device 40 is provided between the secondary transfer device 30 and the fixing device 40. Moreover, an ejection transport route 59 including a paper ejection roll pair 59*a* for ejecting the recording paper 5 after fixing, which is delivered from the fixing device 40 by an outlet roll 36, to a paper ejection portion 58 on an upper portion of the apparatus body 1*a* is provided in a portion of the image forming apparatus 1 near the paper ejection port formed in the apparatus body 1*a*.

Reference sign 200 in FIG. 1 indicates a control device that comprehensively controls the operation of the image forming apparatus 1. The control device 200 includes a central processing unit (CPU), a read only memory (ROM), a random access memory (RAM) (not shown), a bus for connecting the CPU, the ROM, and the like to each other, a communication interface, and the like. Additionally, reference sign 201 indicates a communication unit in which the image forming apparatus 1 communicates with an external device, and reference sign 202 indicates an image processing unit that processes image information input via the communication unit 201.

Operation of Image Forming Apparatus

Hereinafter, the basic image forming operation by the image forming apparatus 1 will be described.

Here, first, the operation in the full-color mode in which a full-color image configured by combining toner images of four colors (Y, M, C, K) is formed using the four image creating devices 10 (Y, M, C, K) will be is described.

Regarding the image forming apparatus 1, in a case where the control device 200 receives request command information for a full-color image forming operation (printing) from an user interface, a printer driver, or the like (not shown) via the communication unit 201, the control device 200 starts the four image creating devices 10 (Y, M, C, K), the intermediate transfer device 20, the secondary transfer device 30, the fixing device 40, and the like.

Then, in each image creating device 10 (Y, M, C, K), as shown in FIG. 1, each photoconductive drum 11 first rotates in the direction indicated by the arrow A, and each charging device 12 charges the surface of the photoconductive drum 11 to a required polarity (negative polarity in Exemplary Embodiment 1) and a required potential. Subsequently, the exposure device 13 irradiates the surface of the photoconductive drum 11 after charging with light emitted on the basis of image signals obtained by converting the image information input to the image forming apparatus 1 into each color component (Y, M, C, K) by the image processing unit 202, and forms an electrostatic latent image of each color component configured with a required potential difference on the surface thereof.

Subsequently, each image creating device 10 (Y, M, C, K) supplies a toner of a corresponding color (Y, M, C, K) charged with a required polarity (negative polarity) from the developing roll 141 to the electrostatic latent image of each color component formed on the photoconductive drum 11 and causes the toner to electrostatically adhere to the electrostatic latent image for development. By virtue of this development, the electrostatic latent images of the respective color components formed on the respective photoconductive drums 11 are developed as toner images of four colors (Y, M, C, K) developed with the toners of the corresponding colors.

Subsequently, in a case where the toner image of each color formed on the photoconductive drum 11 of each image creating device 10 (Y, M, C, K) is transported to the primary transfer position, the primary transfer device 15 (Y, M, C, K) primarily transfers the toner image of each color in a state in which the toner image of each color is sequentially superimposed on the intermediate transfer belt 21 while rotating in the direction indicated by the arrow B of the intermediate transfer device 20.

Additionally, in each image creating device 10 (Y, M, C, K) in which the primary transfer is completed, the drum cleaning device 16 removes deposits to scrape off the deposits and cleans the surface of the photoconductive drum 11. Accordingly, each image creating device 10 (Y, M, C, K) is in a state in which the next image creating operation can be performed.

Subsequently, the intermediate transfer device 20 holds the toner image that is primarily transferred by the rotation of the intermediate transfer belt 21 and transports the toner image to the secondary transfer position. Meanwhile, in the paper feed device 50, the required recording paper 5 is delivered to the paper feed transport route 56 in conformity with the image creating operation. In the paper feed transport route 56, the paper transport roll pair 54 serving as the registration roll delivers and supplies the recording paper 5 to the secondary transfer position in conformity with a transfer timing.

At the secondary transfer position, the secondary transfer device 30 collectively secondarily transfers the toner image on the intermediate transfer belt 21 to the recording paper 5. Additionally, in the intermediate transfer device 20 in which the secondary transfer is completed, the belt cleaning device 28 removes and cleans the deposits such as toner remaining on the surface of the intermediate transfer belt 21 after the secondary transfer.

Subsequently, the recording paper 5 on which the toner image is secondarily transferred is peeled off from the intermediate transfer belt 21 and then transported to the fixing device 40 via the paper transport route 57. In the fixing device 40, by introducing and passing the recording paper 5 after the secondary transfer into and through the contact portion between the rotating heating belt 42 and the pressure roll 43, the required fixing treatment (heating and pressurizing) is performed, and an unfixed toner image is fixed on the recording paper 5. Finally, the recording paper 5 after the fixing is completed is ejected to, for example, the paper ejection portion 58 installed in the upper portion of the apparatus body 1*a* by the paper ejection roll pair 59*a*.

By the above operation, the recording paper 5 on which the full-color image configured by combining the toner images of four colors is formed is output.

Configuration of Fixing Device

Figure 2:
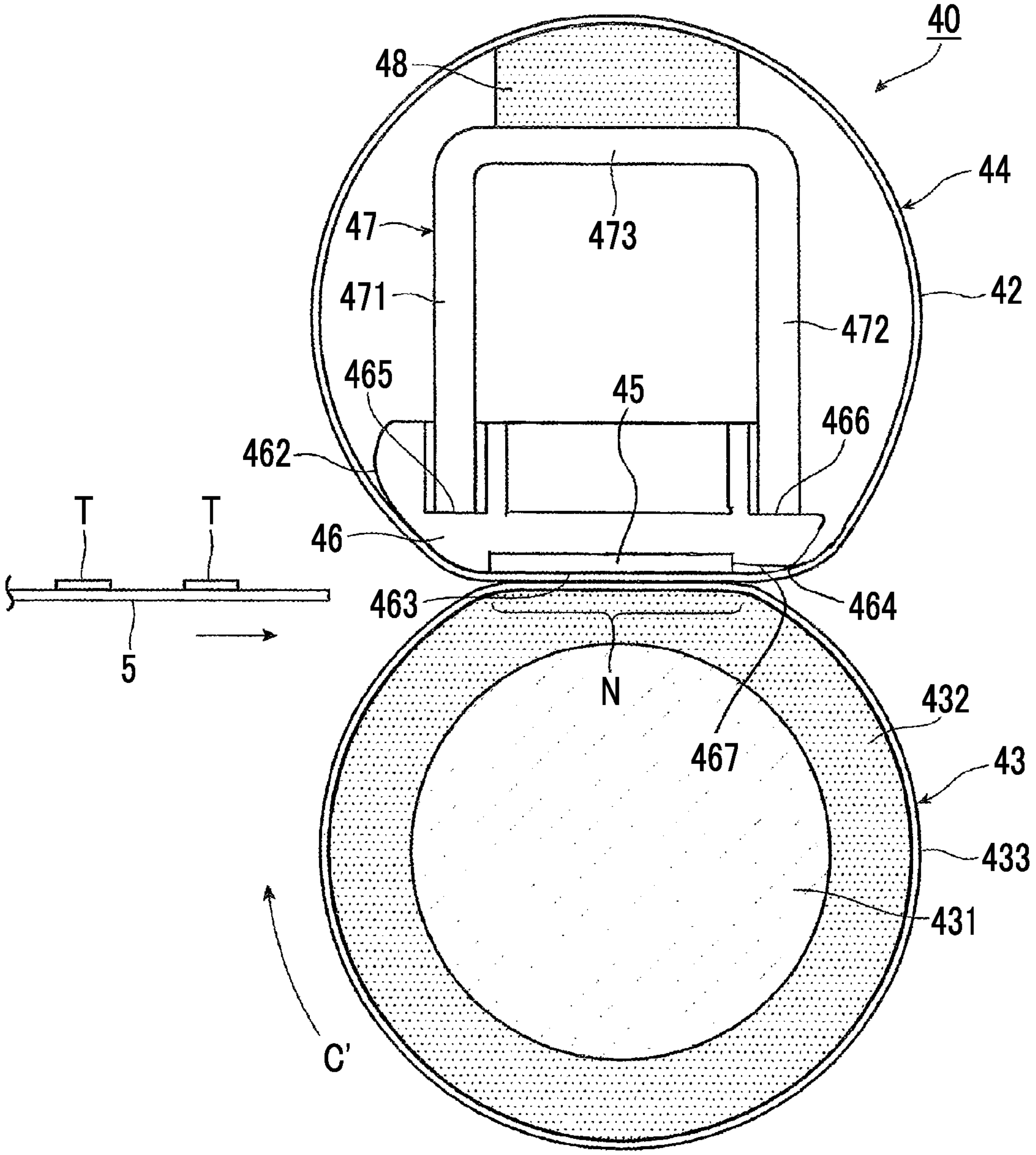
FIG. 2 is a cross-sectional configuration diagram showing the fixing device according to Exemplary Embodiment 1 of the present invention.

FIG. 2 is a cross-sectional configuration diagram showing the fixing device according to Exemplary Embodiment 1.

As the fixing device 40, a so-called free belt nipping type fixing device has been adopted. As shown in FIG. 2, the fixing device 40 mainly includes a heating unit 44 having the heating belt 42 serving as an example of a rotating endless belt, and the pressure roll 43 serving as an example of a pressurizing section being in pressure contact with the heating unit 44. A fixing nip portion N, which is a region through which the recording paper 5 serving as an example of a heating target (fixation target member) holding an unfixed toner image T serving as an example of an unfixed image passes, is formed between the heating belt 42 and the pressure roll 43. In addition, the recording paper 5 is transported with a center in a direction intersecting a transport direction as a reference (so-called center registration).

As shown in FIG. 2, the heating unit 44 includes the heating belt 42, a ceramic heater 45 serving as an example of a planar heat-generating member that is disposed inside the heating belt 42 and heats the heating belt 42, a pad member 46 serving as an example of a supporting section that is also disposed inside the heating belt 42 and supports the ceramic heater 45 to be in pressure contact with a surface of the pressure roll 43 via the heating belt 42, a holding member 47 serving as an example of a holding section that is also disposed inside the heating belt 42 and holds the pad member 46 to be in pressure contact with the pressure roll 43, and a felt member 48 serving as an example of a lubricant holding section that is disposed in inside the heating belt 42 and holds a lubricant applied to an inner peripheral surface of the heating belt 42.

In addition, in the ceramic heater 45 serving as an example of the planar heat-generating member, as will be described later, a heat-generating portion itself does not need to be planar and the heat-generating portion may be linearly formed as long as a lower end surface of the ceramic heater that heats the heating belt 42 is planar.

Figure 3:
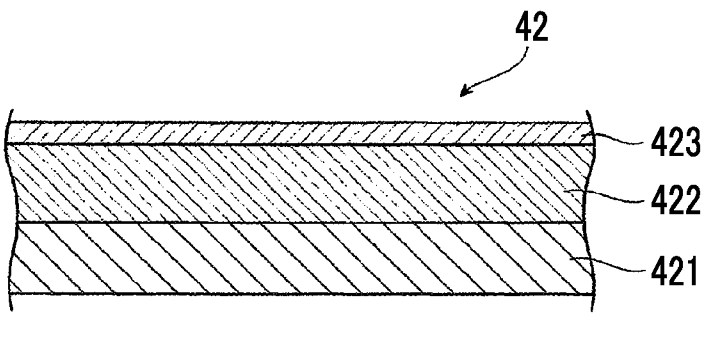
FIG. 3 is a cross-sectional configuration diagram showing a heating belt.

The heating belt 42 is made of a material having flexibility and is configured as an endless belt in which a free shape thereof is thin-walled cylindrical in a state before mounting. As shown in FIG. 3, the heating belt 42 includes a base material layer 421, an elastic body layer 422 coated on a surface of the base material layer 421, and a release layer 423 coated on a surface of the elastic body layer 422. The heating belt 42 includes the elastic body layer 422 on a surface side thereof, and a surface layer including the elastic body layer 422 is configured to be elastically deformable. The base material layer 421 is formed of a heat-resistant synthetic resin such as polyimide, polyamide, or polyamideimide, or a thin metal such as stainless steel, nickel, and copper. The elastic body layer 422 is made of a heat-resistant elastic body such as silicone rubber or fluororubber. The release layer 423 is formed of perfluoroalkoxyalkane (PFA), polytetrafluoroethylene (PTFE), or the like. The thickness of the heating belt 42 can be set to, for example, about 100 to 600 μm.

Figure 4:
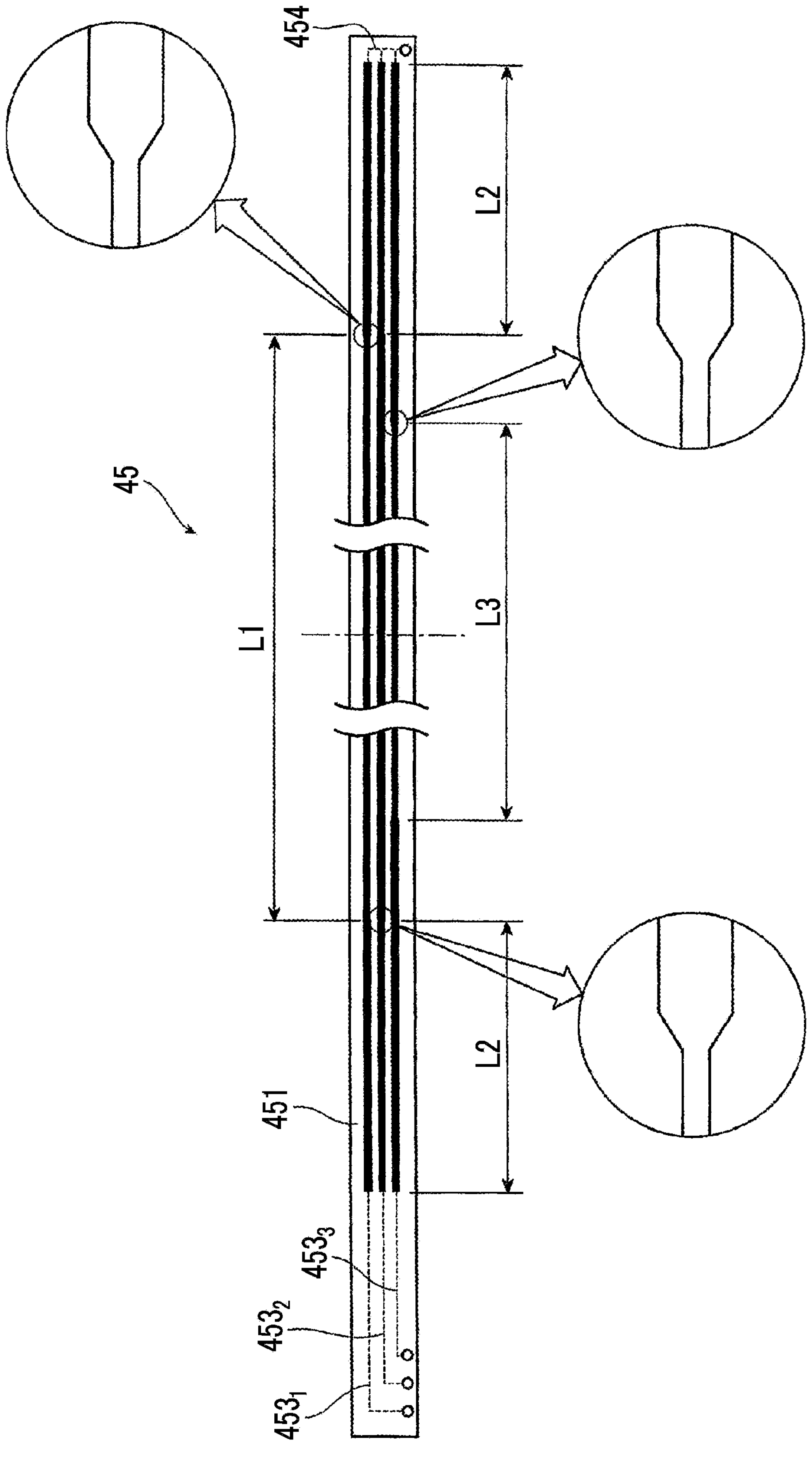
FIG. 4 is a plan configuration diagram showing heat-generating portions of a ceramic heater.
Figure 5:
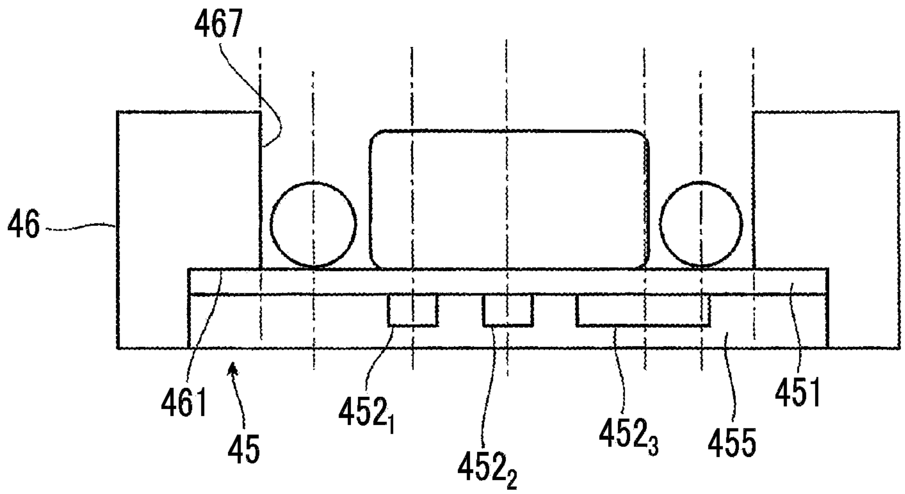
FIG. 5 is a cross-sectional configuration diagram showing a major part of the fixing device according to Exemplary Embodiment 1 of the present invention.

As shown in FIGS. 4 and 5, the ceramic heater 45 includes a ceramic substrate 451, a plurality of first to third heat-generating portions $\mathbf{452}_1$ to $\mathbf{452}_3$ linearly formed in the longitudinal direction on the surface of the substrate 451, first to third electrodes $\mathbf{453}_1$ to $\mathbf{453}_3$ for individually energizing the first to third heat-generating portions $\mathbf{452}_1$ to $\mathbf{452}_3$, a common electrode 454 that commonly energizes the other end portions of the first to third heat-generating portions $\mathbf{452}_1$ to $\mathbf{452}_3$, and a glass coating layer 455 that is coated on surfaces of at least the first to third heat-generating portions $\mathbf{452}_1$ to $\mathbf{452}_3$.

As shown in FIG. 4, the first to third heat-generating portions $\mathbf{452}_1$ to $\mathbf{452}_3$ are disposed to be parallel to each other along a width direction of the substrate 451. Regarding the first to third heat-generating portions $\mathbf{452}_1$ to $\mathbf{452}_3$, the line widths and/or the thicknesses of heat-generating materials constituting the first to third heat-generating portions $\mathbf{452}_1$ to $\mathbf{452}_3$ are made different from each other so that heat-generating regions along the longitudinal direction of the first to third heat-generating portions $\mathbf{452}_1$ to $\mathbf{452}_3$ are set to be different from each other. In addition, the lengths of the first to third heat-generating portions $\mathbf{452}_1$ to $\mathbf{452}_3$ are set to be equal in the longitudinal direction.

Regarding the first heat-generating portion 4521, the line width of a heat-generating material in a region of a length L1, which is positioned at a center of the heat-generating region, is set to be small for large electrical resistance so that heat is generated over the region of the length L1 right and left with respect to the center of the heat-generating region in the longitudinal direction. Regarding the first heat-generating portion 4521, the line widths of heat-generating materials in regions positioned at both end portions of the length L1 are set to be large for small electrical resistance so that heat is not generated or a very small amount of heat is generated even in the case of heat generation.

Regarding the second heat-generating portion 4522, contrary to the first heat-generating portion 4521, the line widths of heat-generating materials in regions other than the length L1, which are positioned to the right and the left of the center in the longitudinal direction, are set to be small so that heat is generated over the regions other than the length L1 right and left with respect to the center in the longitudinal direction. Regarding the second heat-generating portion 4522, the line widths of heat-generating materials in regions positioned at both end portions of the length L1 are set to be large so that heat is not generated or a very small amount of heat is generated even in the case of heat generation.

Regarding the third heat-generating portion 4523, unlike the first and second heat-generating portions 4521 and 4522, the line width of a heat-generating material in a region of a length L3, which is positioned at the center of the heat-generating region, is set to be small for large electrical resistance so that heat is generated over the region of the length L3 right and left with respect to the center of the heat-generating region in the longitudinal direction. Regarding the third heat-generating portion 4523, the line widths of heat-generating materials in regions positioned at both end portions of the length L3 are set to be large for small electrical resistance so that heat is not generated or a very small amount of heat is generated even in the case of heat generation.

Figure 6:
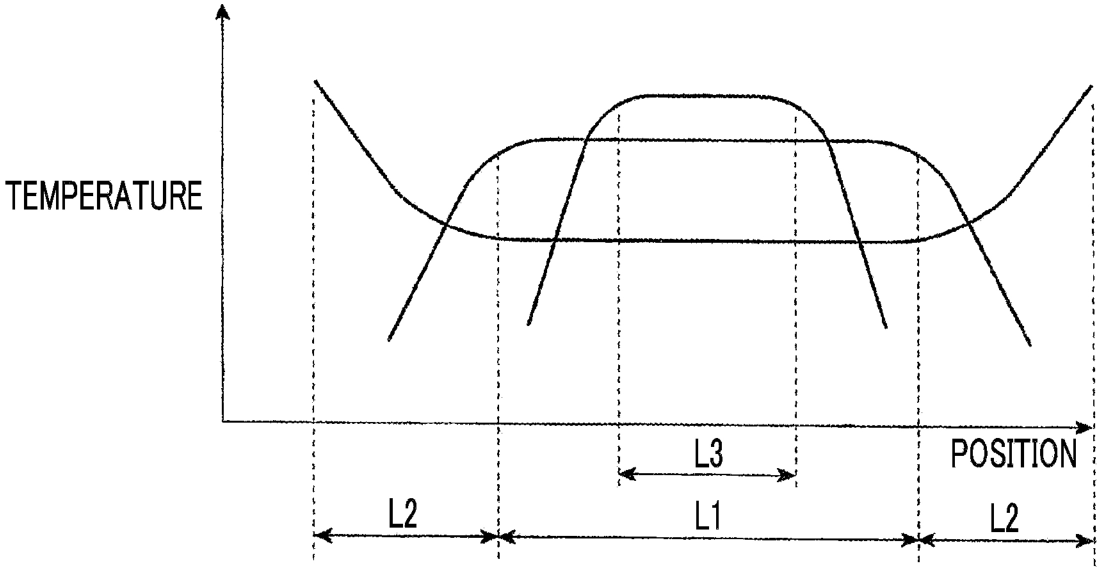
FIG. 6 is a graph showing the heat generation temperature of the ceramic heater.

FIG. 6 is a graph schematically showing the heat generation temperatures of the first to third heat-generating portions $\mathbf{452}_1$ to $\mathbf{452}_3$.

As shown in FIG. 6, the first heat-generating portion 4521 generates heat over the region of the length L1 right and left with respect to the center of the heat-generating region in the longitudinal direction such that a set temperature set in advance is reached. The second heat-generating portion 4522 generates heat over the regions other than the length L1 right and left with respect to the center in the longitudinal direction such that a set temperature set in advance is reached. The third heat-generating portion 4523 generates heat over the region of the length L3 right and left with respect to the center of the heat-generating region in the longitudinal direction such that a set temperature set in advance is reached.

As shown in FIG. 4, the first heat-generating portion $\mathbf{452}_1$ is used to heat and fix the medium-length recording paper 5 of which a length in a direction intersecting the transport direction of the recording paper 5 is L1.

The second heat-generating portion $\mathbf{452}_2$ is used at the same time as the first heat-generating portion $\mathbf{452}_1$ to heat and fix the large-size recording paper 5 of which a length in the direction intersecting the transport direction of the recording paper 5 is L1+2·L2.

The third heat-generating portion $\mathbf{452}_3$ is used to heat and fix the smallest-size recording paper 5 of which a length in the direction intersecting the transport direction of the recording paper 5 is L3.

As shown in FIG. 2, the holding member 47 is made of, for example, a metallic plate material such as stainless steel, aluminum, or steel. The holding member 47 is formed to have a substantially U-like cross-sectional shape formed by vertical plate portions 471 and 472 that are disposed substantially perpendicular to the surface of the ceramic heater 45 on the upstream side and the downstream side of the fixing nip portion N in a rotational direction of the heating belt 42, and a horizontal plate portion 473 that is disposed in the horizontal direction to connect base end portions of the vertical plate portions 471 and 472.

The temperature of the fixing nip portion N of the heating belt 42 is detected by a temperature sensor (not shown) that is disposed to be in contact with a surface of the ceramic heater 45 that is opposite to the fixing nip portion N. As described above, the ceramic heater 45 includes the first to third heat-generating portions $\mathbf{452}_1$ to $\mathbf{452}_3$ having different heat-generating regions in the longitudinal direction. For that reason, a plurality (for example, three) of temperature sensors are disposed in the longitudinal direction of the ceramic heater 45 in correspondence with the first to third heat-generating portions $\mathbf{452}_1$ to $\mathbf{452}_3$. The heating belt 42 is heated such that the fixing nip portion N reaches a required fixing temperature (for example, about 200° C.) depending on the size of the recording paper 5 by controlling the energization of the first to third heat-generating portions $\mathbf{452}_1$ to $\mathbf{452}_3$ of the ceramic heater 45 on the basis of the detection result of the temperature sensor by a temperature control circuit (not shown).

As shown in FIG. 2, the pad member 46 is made of, for example, a heat-resistant synthetic resin integrally molded into a required shape by injection molding or the like.

Examples of the heat-resistant synthetic resin include liquid crystal polymer (LCP), polyetheretherketone (PEEK), polyphenylene sulfide (PPS), polyethersulfone (PES), polyamideimide (PAI), polytetrafluoroethylene (PTFE), polychlorotrifluoroethylene (PCTFE), polyvinylidene fluoride (PVDF), or a composite material thereof.

The pad member 46 has a support recess portion 461 that supports the ceramic heater 45 to pressurize the pressure roll 43 via the heating belt 42 at the fixing nip portion N and has an elongated rectangular shape corresponding to the planar shape of the ceramic heater 45. The pad member 46 is disposed to be longer than the total length in the longitudinal direction of the heating belt 42.

As shown in FIG. 2, the pad member 46 is provided with a first guide portion 462 that is formed to have a curved cross-sectional shape and guides the heating belt 42 to the fixing nip portion N on an upstream side with respect to the fixing nip portion N in the rotational direction of the heating belt 42. A lower end surface 463 of the pad member 46 is formed in a planar shape. Additionally, the pad member 46 is provided with a regulating portion 464 that regulates the traveling position of the heating belt 42 passing through the fixing nip portion N on a downstream side with respect to the fixing nip portion N in the rotational direction of the heating belt 42. The pad member 46 also serves as a regulating section that regulates the traveling position of the heating belt 42.

Additionally, as shown in FIG. 2, the pad member 46 is provided with abutment portions 465 and 466 where tips of vertical plate portions 471 and 472 of the holding member 47 abut against a surface of the pad member 46 that is opposite to the fixing nip portion N.

As shown in FIG. 2, the pressure roll 43 has a columnar or cylindrical core metal 431 made of metal such as stainless steel, aluminum, or iron (thin-walled high-tension steel pipe), an elastic body layer 432 made of a heat-resistant elastic body such as silicone rubber or fluororubber relatively thickly coated at an outer periphery of the core metal 431, and a release layer 433 made of polytetrafluoroethylene (PTFE), perfluoroalkoxyalkane (PFA), or the like thinly coated on the surface of the elastic body layer 432. In addition, as necessary, a heating section (heating source) including a halogen lamp or the like may be disposed inside the pressure roll 43.

Both end portions in the longitudinal direction (axial direction) of the pressure roll 43 are rotatably supported by a frame of a device housing (not shown) of the fixing device 40 via a bearing member. The pressure roll 43 is configured to be brought into pressure contact with a lower end surface of the ceramic heater 45 by a pressurizing mechanism (not shown) with a required pressing force, the ceramic heater 45 being held by the pad member 46. The pressure roll 43 is rotationally driven at a required speed in a direction of arrow C' by the drive device via a drive gear (not shown) attached to one end portion in an axial direction of the core metal 431 that also serves as a rotation shaft. In addition, the heating belt 42 is in pressure contact with the rotationally driven pressure roll 43 and rotates in a driven manner.

As shown in FIG. 2, in the case of the fixing device 40 configured as described above, the heating belt 42 that is heated by the ceramic heater 45 is used as the heating section. The heating belt 42 is a thin-walled cylindrical member, has a smaller heat capacity than a heating roll, has a shorter warm-up time between the start of heating and a time, at which a temperature at which fixing is possible, is reached, and is widely used in the image forming apparatus 1.

As a fixing device for which such a heating belt is adopted, a fixing device as disclosed in JP2010-128299A and the like are known. In the case of JP2010-128299A, a sliding portion of a support member that comes into contact with a belt surface has a shape in which a heating member is bent to protrude in a direction toward a pressurizing member and a ratio between the maximum value of the deformation rate of an elastic layer surface of a bent portion and the minimum value of the deformation rate of the elastic layer surface at a nip portion satisfies a certain relationship, so that a high speed and a high image quality are achieved for a color image (particularly both glossiness and graininess/sharpness are achieved).

However, regarding a fixing device for which a heating belt is adopted, in a case where a sliding portion of a support member is provided with a bent portion that bends the heating belt to protrude toward a pressurizing member at a nip portion so that a pressure peak and a distortion peak of an elastic layer surface are configured for the purpose of improving the image quality, a change in curvature of recording paper is maximal at the position of the peak of pressure against the recording paper and the recording paper is greatly curved and thus a curl is formed. Therefore, there is a technical problem that the recording paper transportability is deteriorated.

Therefore, in order to restrain a fixation target medium from being curved while securing fixability, the fixing device according to Exemplary Embodiment 1 is configured such that a maximum deformation position at which the degree of deformation of a belt surface is maximal is set to a position different from a maximum pressure position at which a pressurizing force of a belt is maximal.

Additionally, the fixing device according to Exemplary Embodiment 1 is configured to include a regulating section that regulates the traveling position of a belt such that the maximum deformation position at which the degree of deformation of the belt surface is maximal is made different from the maximum pressure position at which the pressurizing force of the belt is maximal.

Figure 7:
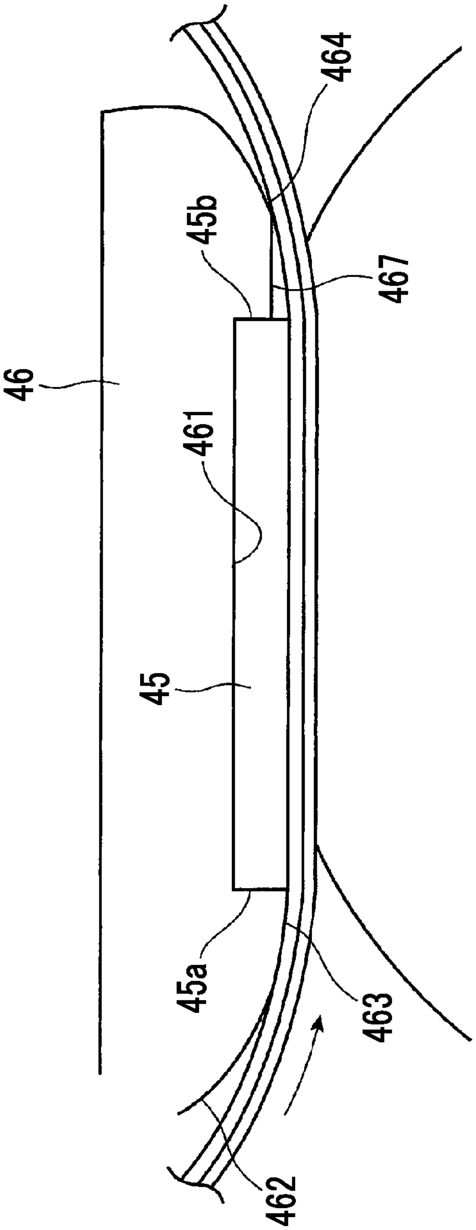
FIG. 7 is a cross-sectional configuration diagram showing a major part of the fixing device according to Exemplary Embodiment 1 of the present invention.

That is, as shown in FIGS. 2 and 7, the fixing device 40 according to Exemplary Embodiment 1 is provided with the pad member 46 serving as an example of the regulating section that regulates the traveling position of the heating belt 42 such that a maximum deformation position at which the degree of deformation of a surface of the heating belt 42 is maximal is made different from a maximum pressure position at which a pressurizing force of the heating belt 42 is maximal.

As described above, the pad member 46 includes the support recess portion 461 that accommodates the ceramic heater 45 and that has an elongated rectangular shape. As shown in FIG. 7, a surface of the pad member 46 accommodating the ceramic heater 45 forms a surface 463 flush with the lower surface of the ceramic heater 45 on an upstream side with respect to the fixing nip portion N in a movement direction of the recording paper 5 and the surface 463 is connected to the first guide portion 462 that guides the heating belt 42 to the fixing nip portion N outside the fixing nip portion N.

Figure 9:
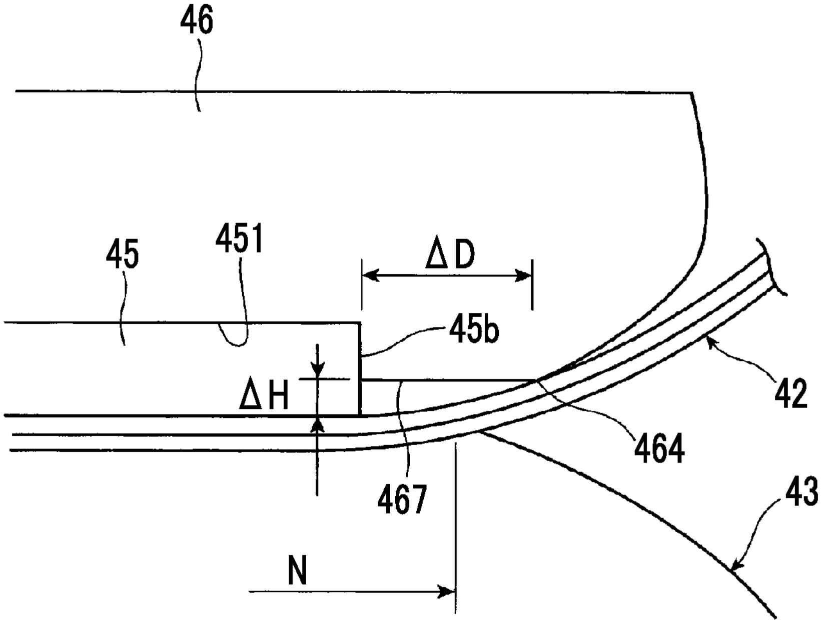
FIG. 9 is an enlarged view of a major part of FIG. 7.

Meanwhile, as shown in FIG. 9, the surface of the pad member 46 accommodating the ceramic heater 45 forms a stepped portion 467 that is retracted upward in the drawing over a required minute height ΔH from the lower surface of the ceramic heater 45 on a downstream side with respect to the fixing nip portion N in the movement direction of the recording paper N and the stepped portion 467 is provided over a required minute length ΔD along the horizontal direction. On a downstream side with respect to the stepped portion 467 in the movement direction of the recording paper 5, a regulating portion 464 that abuts against an inner surface of the heating belt 42 and regulates the traveling position of the heating belt 42 is formed.

As shown in FIG. 2, the surface of the heating belt 42 is pressed by the pressure roll 43 and thus the inner surface thereof is brought into pressure contact with the pad member 46 and the ceramic heater 45, so that the fixing nip portion N is formed.

Figure 8:
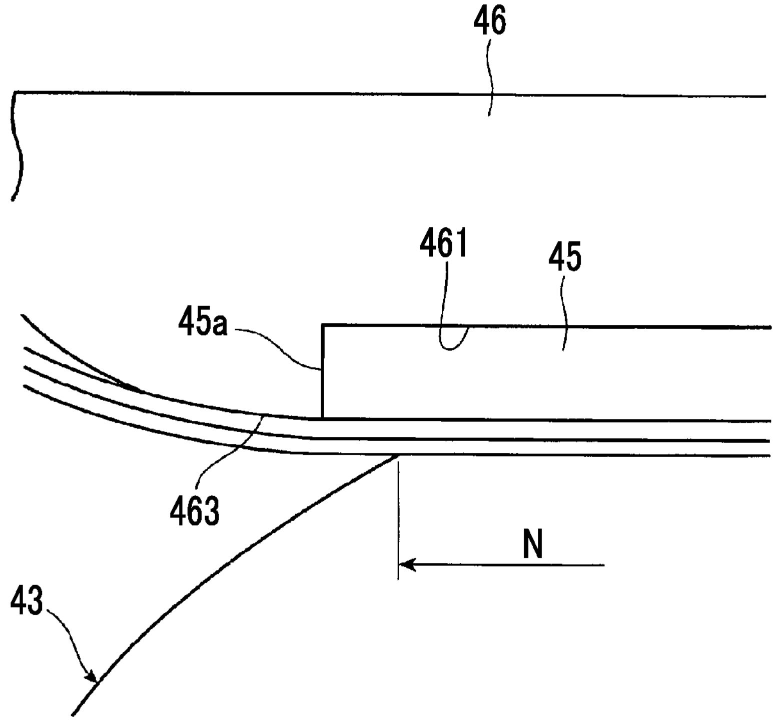
FIG. 8 is an enlarged view of a major part of FIG. 7.

In Exemplary Embodiment 1, as shown in FIGS. 7 and 8, an upstream end portion of the fixing nip portion N in the movement direction of the recording paper 5 is positioned downstream of an end portion 45*a* of the ceramic heater 45 that is on the upstream side in the movement direction of the recording paper 5. Additionally, in Exemplary Embodiment 1, as shown in FIG. 9, a downstream end portion of the fixing nip portion N in the movement direction of the recording paper 5 is positioned downstream of an end portion 45*b* of the ceramic heater 45 that is on the downstream side in the movement direction of the recording paper 5. Here, it is a matter of course that the end portion 45*b* of the ceramic heater 45 that is on the downstream side in the movement direction of the recording paper 5 is positioned upstream of the downstream end portion of the fixing nip portion N in the movement direction of the recording paper 5.

As described above, the end portion 45*b* of the ceramic heater 45 that is on the downstream side in the movement direction of the recording paper 5 is provided with the stepped portion 467 at which the surface of the pad member 46 is retracted upward.

Figure 10:
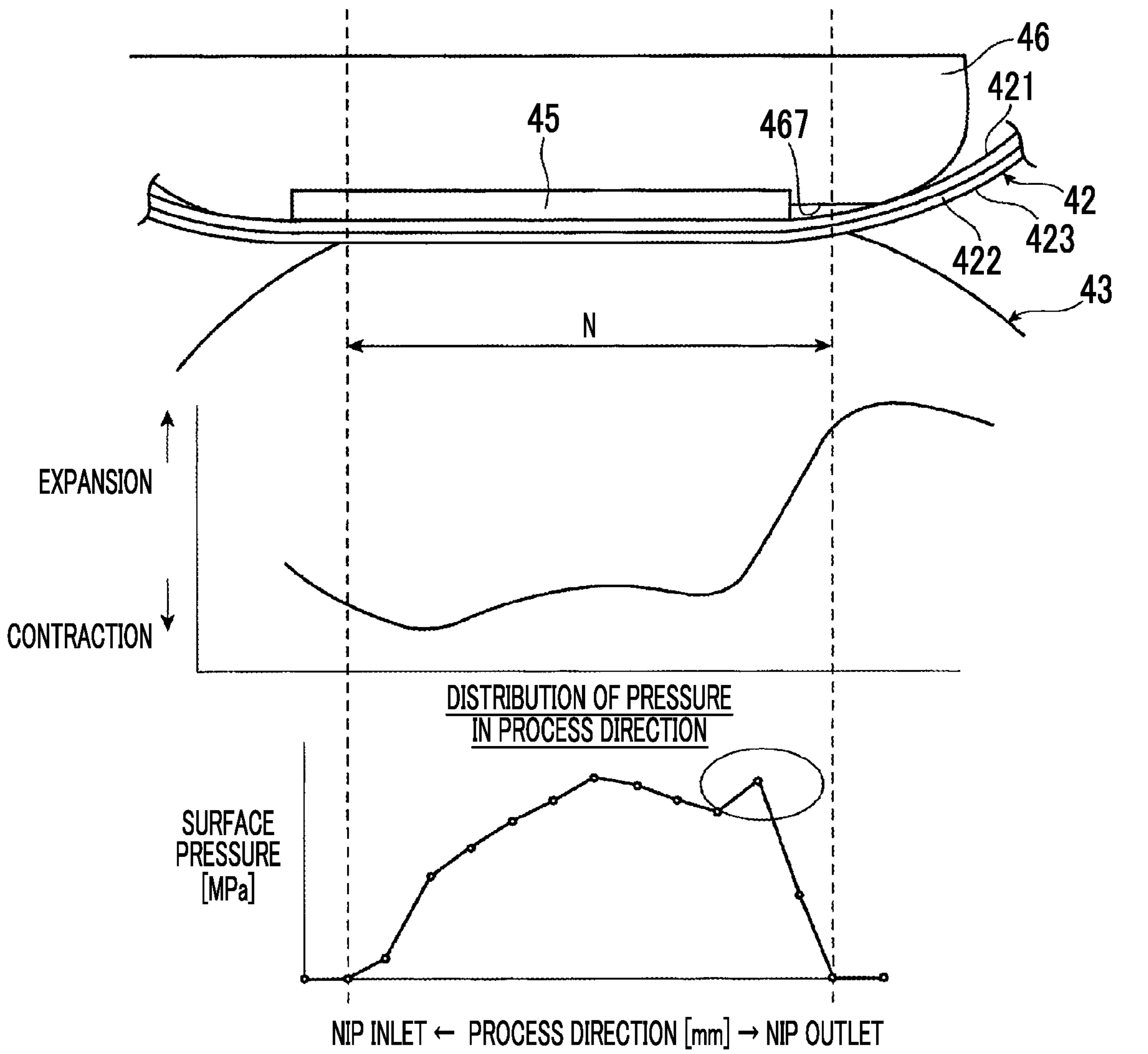
FIG. 10 is a description diagram showing a major part of the fixing device according to Exemplary Embodiment 1 of the present invention.

The heating belt 42 is pressed toward a surface of the ceramic heater 45 by the pressure roll 43 at the fixing nip portion N and as shown in FIG. 10, the maximum pressure position at which the pressurizing force of the heating belt 42 is maximal is at the end portion 45*b* of the ceramic heater 45 that is on the downstream side in the movement direction of the recording paper 5.

Since the end portion 45*b* of the ceramic heater 45 that is on the downstream side in the movement direction of the recording paper 5 is provided with the stepped portion 467, the pressurizing force of the heating belt 42 is sharply decreased to zero on a downstream side with respect to the maximum pressure position in the movement direction of the recording paper 5. A position where the pressurizing force of the heating belt 42 becomes zero is the downstream end portion of the fixing nip portion N in the movement direction of the recording paper 5. The position where the pressurizing force of the heating belt 42 becomes zero is positioned within the range of the stepped portion 467 of the pad member 46.

In addition, in the exemplary embodiment shown in the drawing, as shown in FIG. 10, another maximum pressure position at which the pressurizing force of the heating belt 42 is maximal is present on an upstream side of the fixing nip portion N in the movement direction of the recording paper 5. The maximum pressure position present on the upstream side of the fixing nip portion N in the movement direction of the recording paper 5 approximately corresponds to the central position of the pressure roll 43.

In Exemplary Embodiment 1, as shown in FIG. 7, only the ceramic heater 45 is in contact (pressure contact) with the pressure roll 43 along the movement direction of the recording paper at the fixing nip portion N. Therefore, the maximum pressure position where the pressurizing force of the heating belt 42 is maximal is determined based on a positional relationship between the ceramic heater 45 and the pressure roll 43 in a case where the width of the ceramic heater 45 in the movement direction and the recording paper 5 and the outer diameter of the pressure roll 43 are constant.

In Exemplary Embodiment 1, in order that the position of the end portion of the ceramic heater 45 that is on the downstream side in the movement direction of the recording paper 5 becomes the maximum pressure position at which the pressurizing force of the heating belt 42 is maximal, for example, as shown in FIG. 7, the position of the end portion 45*b* of the ceramic heater 45 that is on the downstream side in the movement direction of the recording paper is disposed to be inclined along the movement direction of the recording paper 5 toward the surface of the pressure roll 43 although the angle of inclination is small.

The heating belt 42 includes the elastic body layer 422 as a surface layer thereof, and is elastically deformed during movement in the fixing nip portion N. Since the recording paper 5 passes through the fixing nip portion N in a state of being in close contact with the heating belt 42, elastic deformation of the heating belt 42 in the fixing nip portion N directly influences the transportability of the recording paper 5.

In Exemplary Embodiment 1, the maximum deformation position at which the degree of deformation of the surface of the heating belt 42 is maximal is set to a position different from the maximum pressure position at which the pressurizing force of the heating belt 42 is maximal.

Furthermore, in Exemplary Embodiment 1, as shown in FIG. 10, the maximum deformation position of the surface of the heating belt 42 is set to be slightly close to an outer side than an outlet of the fixing nip portion N.

Figure 11:
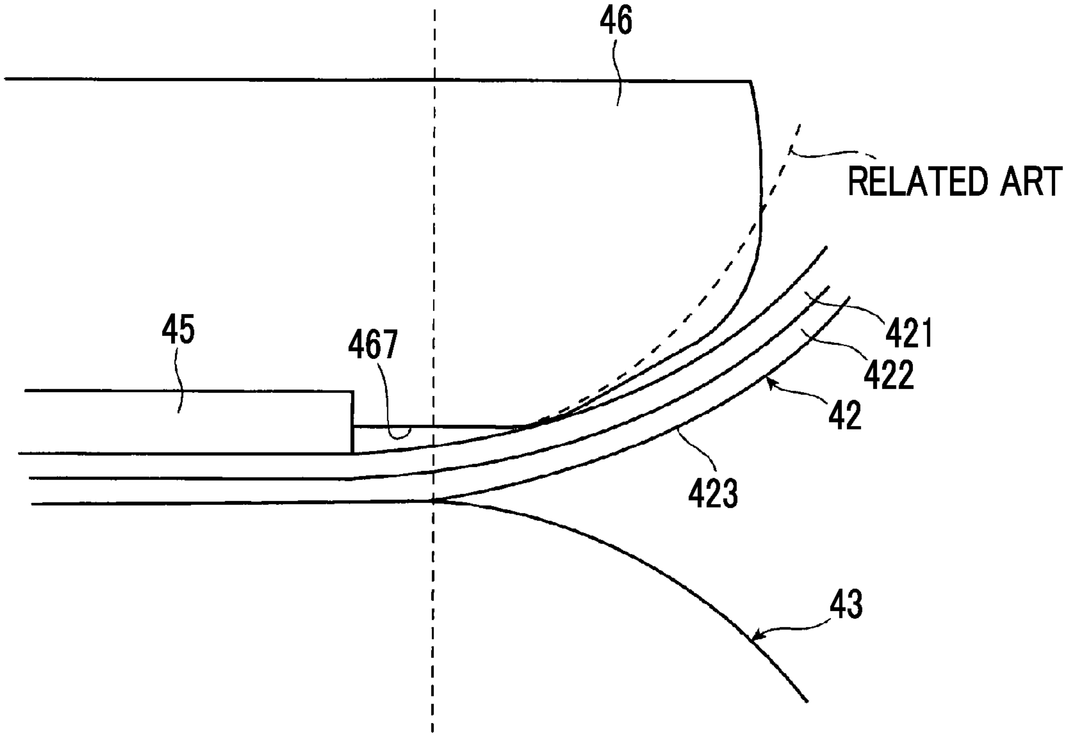
FIG. 11 is an enlarged description diagram showing a major part of the fixing device according to Exemplary Embodiment 1 of the present invention.

In the case of a fixing device in the related art, after the heating belt 42 passes through the fixing nip portion N, the inner surface of the heating belt 42 moved to a downstream side along the transport direction of the recording paper 5 with the inner surface thereof being guided by the pad member 46 as indicated by a broken line in FIG. 11.

Meanwhile, in the case of the fixing device 40 according to Exemplary Embodiment 1, as shown in FIG. 11, an end portion 45*b* of the ceramic heater 45 that is on the downstream side in the transport direction of the recording paper 5 is provided with the stepped portion 467 and the regulating portion 464 that regulates the traveling position of the heating belt 42 toward the pressure roll 43 side is provided on a downstream side with respect to the stepped portion 467 in the transport direction of the recording paper 5.

Figure 12:
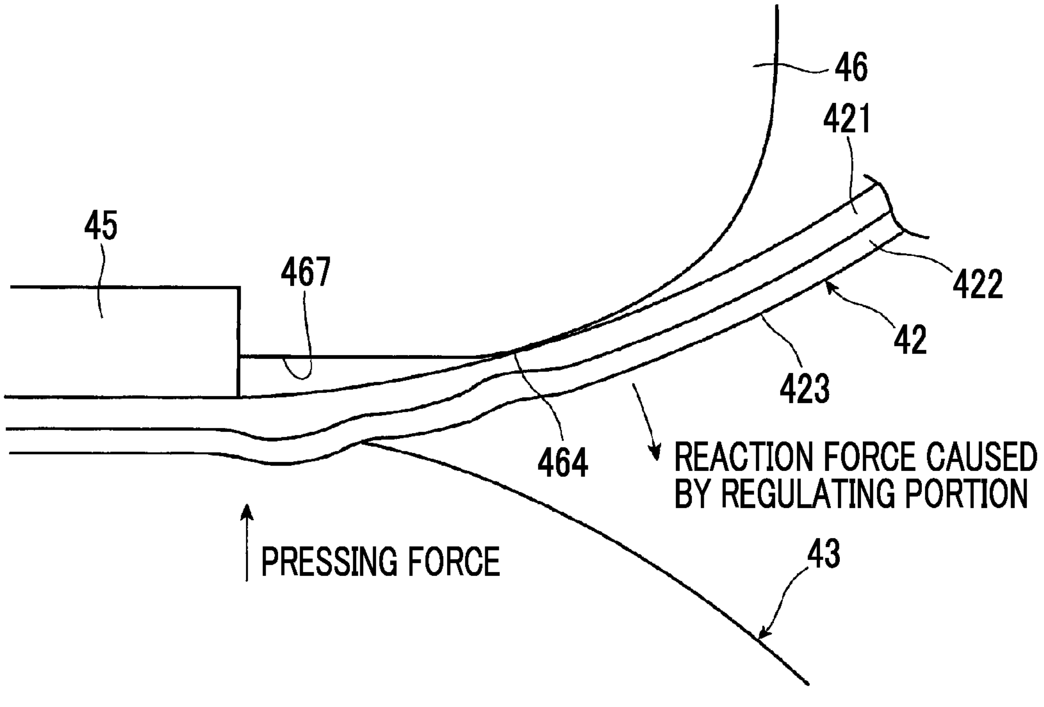
FIG. 12 is an enlarged description diagram showing a major part of the fixing device according to Exemplary Embodiment 1 of the present invention.

Therefore, as shown in FIG. 12, after the heating belt 42 passes through the fixing nip portion N, the traveling position thereof is regulated by the regulating portion 464 of the pad member 46 and the heating belt 42 is deformed into a shape curved toward the pressure roll 43 side. As a result, the heating belt 42 is restrained from being downwardly curved and is not maximally deformed at the maximum pressure position of the fixing nip portion N. The heating belt 42 is maximally curved immediately after passing through the fixing nip portion N and a position where the heating belt 42 is maximally curved is the maximum deformation position where the degree of deformation of the surface of the heating belt 42 is maximal. A graph in the middle part of FIG. 10 is a graph showing the result of measurement about deformation (distortion) acting on the elastic body layer 422 of the heating belt 42, which is performed by using a distortion sensor instead of the heating belt 42.

Therefore, the recording paper 5 that moves in close contact with the heating belt 42 is peeled off from the heating belt 42 because of the waist of the recording paper 5 at the maximum deformation position at which the degree of deformation of the surface of the heating belt 42 is maximal.

Since the maximum deformation position at which the degree of deformation of the surface of the heating belt 42 is maximal is different from the maximum pressure position at which the pressurizing force of the heating belt 42 is maximal, the recording paper 5 can be restrained from being curved even in a case where the recording paper 5 is curved at the maximum pressure position of the heating belt 42 because being curved at the maximum pressure position is suppressed. As a result, regarding an unfixed toner image to be fixed to a surface of the recording paper 5, it is a matter of course that a favorable fixability can be achieved at the maximum pressure position and the recording paper 5 can be restrained from being curved at the maximum deformation position of the heating belt 42 and a decrease in transportability caused by a curl formed on the recording paper 5 after a fixing treatment can be suppressed.

In addition, the present inventors have performed a simulation test to confirm how the image quality after fixation and deformation of recording paper caused by the maximum deformation position and the maximum pressure position of the heating belt 42 are changed by a change in height of the stepped portion. At that time, the simulation test has been performed for both of a case where the maximum deformation position and the maximum pressure position of the heating belt 42 are different from each other and a case where the maximum deformation position and the maximum pressure position of the heating belt 42 are not different from each other. The height of the stepped portion has been changed in units of 0.1 mm within a range from 1.2 mm to 1.8 mm. Incidentally, the length of the stepped portion has been set to 1.5 mm.

FIG. 13 shows the results of the above simulation test.

As is clear from FIG. 13, in a case where the height of the stepped portion is 1.2 mm or 1.3 mm, deformation (curl) of the recording paper 5 can be suppressed, which is favorable (O). However, the image quality of a fixed image is not favorable (X) even in a case where the maximum deformation position and the maximum pressure position of the heating belt 42 are different from each other. It is considered that this is because a pressure at the maximum pressure position of the heating belt 42 tends to be dispersed and thus the image quality of the fixed image is decreased in a case where the height of the stepped portion is 1.2 mm or 1.3 mm.

Additionally, as is clear from FIG. 13, in a case where the height of the stepped portion exceeds 1.3 mm and is 1.4 mm to 1.6 mm, the image quality of the fixed image and deformation of the recording paper are favorable (O). In addition, even in a case where the height of the stepped portion exceeds 1.6 mm and is equal to or greater than 1.7 mm, it is considered that both of the image quality of the fixed image and deformation of the recording paper are favorable (O) in a case where the maximum deformation position and the maximum pressure position of the heating belt 42 are different from each other.

Therefore, according to the results of the simulation test, it can be found that the height of the stepped portion is, for example, preferably 1.4 mm to 1.6 mm.

Meanwhile, in a case where the height of the stepped portion is 1.7 mm or 1.8 mm and the maximum deformation position and the maximum pressure position of the heating belt 42 are not different from each other, the image quality of the fixed image is favorable (O) but deformation of the recording paper is not favorable (X) and a curl is formed as in the case of the related art.

In addition, in the above exemplary embodiments, the case where the ceramic heater is used as the planar heat-generating section has been described, but the planar heat-generating section is not limited to the ceramic heater, and anything that generates heat literally in a planar manner at the fixing nip portion N may be used.

Additionally, in the above-described exemplary embodiments, the case where the pressure roll is used as the pressurizing section has been described, but a pressure belt may be used as the pressurizing section.

Additionally, although the present invention has been described with the electrophotographic image forming apparatus, the present invention is not limited to the electrophotographic image forming apparatus. For example, it is also possible to apply the present invention to an ink jet type image forming apparatus or the like in which an unfixed ink image is fixed on paper in contact with the paper transported while holding an image of an undried layer with ink (an unfixed ink image).

Supplementary Note (((1)))

A fixing device comprising:

an endless belt of which a surface layer is elastically deformable; and a pressurizing section that is in pressure contact with the belt and that forms a nip portion, wherein a maximum deformation position at which a degree of deformation of a surface of the belt is maximal is set to a position different from a maximum pressure position at which a pressurizing force of the belt is maximal.

(((2)))

The fixing device according to (((1))), further comprising:

a regulating section that regulates a traveling position of the belt such that the maximum deformation position at which the degree of deformation of the surface of the belt is maximal is made different from the maximum pressure position at which the pressurizing force of the belt is maximal.

(((3)))

The fixing device according to (((2))), wherein the regulating section regulates the traveling position of the belt such that the maximum deformation position of the surface of the belt is made closer to an outer side than an outlet of the nip portion.

(((4)))

The fixing device according to (((3))), wherein the regulating section includes an abutment portion that abuts against an inner surface of the belt outside the outlet of the nip portion to regulate the traveling position of the belt such that the belt is deformed in a direction opposite to a direction of deformation at the outlet of the nip portion.

(((5)))

The fixing device according to (((1))), wherein the belt includes the maximum pressure position ahead of an outlet of the nip portion.

(((6)))

The fixing device according to (((5))), further comprising:

a planar heat-generating element that is in pressure contact with the pressurizing section via the belt, wherein an end portion of the planar heat-generating element that is on a downstream side in a movement direction of the belt is in pressure contact with the pressurizing section so that the maximum pressure position is formed.

(((7)))

The fixing device according to (((6))), wherein the regulating section also serves as a holding section that holds the planar heat-generating element.

(((8)))

The fixing device according to (((1))), wherein the regulating section includes a non-contact region that does not come into contact with an inner surface of the belt at an end portion of the nip portion that is on a downstream side in a movement direction of the belt.

(((9)))

The fixing device according to (((8))), wherein the non-contact region of the regulating section is set to have a first distance along the movement direction of the belt and to be retracted by a second distance in a direction away from the pressurizing section.

(((10)))

An image forming apparatus comprising:

an image forming section that forms an image on a recording medium; and a fixing section that fixes the image on the recording medium, wherein the fixing device according to any one of (((1))) to (((9))) is used as the fixing section.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A fixing device comprising:

an endless belt of which a surface layer is elastically deformable; and a pressurizing section that is in pressure contact with the belt and that forms a nip portion, wherein a maximum deformation position at which a degree of deformation of a surface of the belt is maximal is set to a position different from a maximum pressure position at which a pressurizing force of the belt is maximal, wherein the fixing device further comprises a regulating section that regulates a traveling position of the belt such that the maximum deformation position at which the degree of deformation of the surface of the belt is maximal is made different from the maximum pressure position at which the pressurizing force of the belt is maximal, wherein the regulating section forms a stepped portion retracted by a direction away from the pressurizing section.

2. The fixing device according to claim 1, wherein the regulating section regulates the traveling position of the belt such that the maximum deformation position of the surface of the belt is made closer to an outer side than an outlet of the nip portion.

3. The fixing device according to claim 2, wherein the regulating section includes an abutment portion that abuts against an inner surface of the belt outside the outlet of the nip portion to regulate the traveling position of the belt such that the belt is deformed in a direction opposite to a direction of deformation at the outlet of the nip portion.

4. An image forming apparatus comprising:

an image forming section that forms an image on a recording medium; and a fixing section that fixes the image on the recording medium, wherein the fixing device according to claim 3 is used as the fixing section.

5. An image forming apparatus comprising:

an image forming section that forms an image on a recording medium; and a fixing section that fixes the image on the recording medium, wherein the fixing device according to claim 2 is used as the fixing section.

6. The fixing device according to claim 1, wherein the belt includes the maximum pressure position ahead of an outlet of the nip portion.

7. The fixing device according to claim 6, further comprising:

a planar heat-generating element that is in pressure contact with the pressurizing section via the belt, wherein an end portion of the planar heat-generating element that is on a downstream side in a movement direction of the belt is in pressure contact with the pressurizing section so that the maximum pressure position is formed.

8. The fixing device according to claim 7, wherein the regulating section also serves as a holding section that holds the planar heat-generating element.

9. An image forming apparatus comprising:

an image forming section that forms an image on a recording medium; and a fixing section that fixes the image on the recording medium, wherein the fixing device according to claim 8 is used as the fixing section.

10. An image forming apparatus comprising:

an image forming section that forms an image on a recording medium; and a fixing section that fixes the image on the recording medium, wherein the fixing device according to claim 7 is used as the fixing section.

11. An image forming apparatus comprising:

an image forming section that forms an image on a recording medium; and a fixing section that fixes the image on the recording medium, wherein the fixing device according to claim 5 is used as the fixing section.

12. The fixing device according to claim 1, wherein the stepped portion includes a non-contact region that does not come into contact with an inner surface of the belt at an end portion of the nip portion that is on a downstream side in a movement direction of the belt.

13. The fixing device according to claim 12, wherein the non-contact region of the regulating section is set to have a first distance along the movement direction of the belt and to be retracted by a second distance in a direction away from the pressurizing section.

14. An image forming apparatus comprising:

an image forming section that forms an image on a recording medium; and a fixing section that fixes the image on the recording medium, wherein the fixing device according to claim 13 is used as the fixing section.

15. An image forming apparatus comprising:

an image forming section that forms an image on a recording medium; and a fixing section that fixes the image on the recording medium, wherein the fixing device according to claim 12 is used as the fixing section.

16. An image forming apparatus comprising:

an image forming section that forms an image on a recording medium; and a fixing section that fixes the image on the recording medium, wherein the fixing device according to claim 1 is used as the fixing section.

17. A fixing device comprising:

an endless belt of which a surface layer is elastically deformable; and pressurizing means for forming a nip portion, the pressurizing means being in pressure contact with the belt, wherein a maximum deformation position at which a degree of deformation of a surface of the belt is maximal is set to a position different from a maximum pressure position at which a pressurizing force of the belt is maximal, wherein the fixing device further comprises a regulating section that regulates a traveling position of the belt such that the maximum deformation position at which the degree of deformation of the surface of the belt is maximal is made different from the maximum pressure position at which the pressurizing force of the belt is maximal, wherein the regulating section forms a stepped portion retracted by a direction away from the pressurizing means.

* * * * *